(No Model.)

J. B. CRAIG.
SHOE TIE FASTENER.

No. 463,573. Patented Nov. 17, 1891.

Attest:
E. J. Brien
S. S. Merrill

Inventor:
J. B. Craig

UNITED STATES PATENT OFFICE.

JOHN B. CRAIG, OF ST. LOUIS, MISSOURI.

SHOE-TIE FASTENER.

SPECIFICATION forming part of Letters Patent No. 463,573, dated November 17, 1891.

Application filed June 5, 1891. Serial No. 395,249. (No model.)

*To all whom it may concern:*

Be it known that I, JOHN B. CRAIG, a citizen of the United States, residing in the city of St. Louis, in the State of Missouri, have invented a new and useful Shoe-Tie Fastener, of which the following is a specification.

My invention relates to improvements in shoe-tie fasteners, in which the string or cord after it has been reeved through eyelets or in hooks provided on a shoe or other similar article requiring lacing is drawn taut at the ends and then inserted in a clamping device at the top and is thereby fastened. or held; and the objects of my improvement are, first, to provide bearings for the cord or lace in the fastener which will hold it firmly under the strains incident to its use without cutting; second, to afford facilities for rapidly adjusting the lacing-cord in the fastener and disengaging the same therefrom when desired. I attain these objects by the mechanism illustrated in the accompanying drawings, in which—

Figure 1:
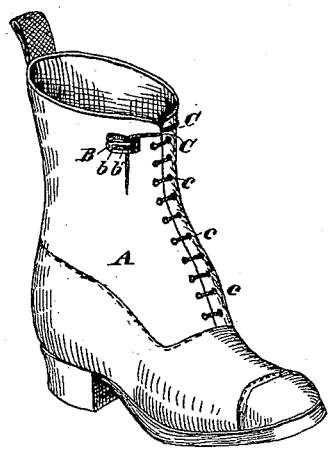
Figure 2:
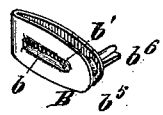
Figure 3:
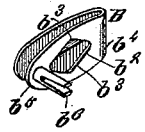
Figure 4:
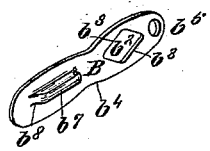
Figure 5:
Figure 6:
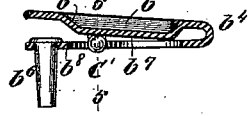
Figure 7:
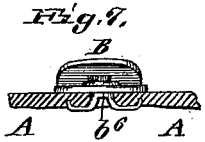

Figure 1 is a perspective elevation of a laced shoe provided with my improved fastener in place upon the upper part of the shoe-flaps and holding the lace-cord. Fig. 2 is a top perspective view of my fastener ready to be applied; Fig. 3, a similar view of the same inverted. Fig. 4 is a perspective view of the sheet-metal-blank fastener before folding. Fig. 5 is a lateral view in cross-section of the fastener and cord on line 5 5, Fig. 6. Fig. 6 is a longitudinal view in cross-section of the same on line 6 6, Fig. 5; and Fig. 7 is a sectional view showing the mode of attaching the fastener to the shoe.

Similar letters and figures refer to similar parts throughout the drawings.

The shoe A, which in this behalf represents any analogous article, provided with flaps and eyelets or hooks for lacing purposes, constitutes the base or receptacle for the fastener.

B, Figs. 2 and 3, represents my improved fastener, which is made by punching from sheet metal a blank of from one inch to an inch and a half long and about three-eighths of an inch in width. (See Fig. 4.) These dimensions are merely approximate, however, as the size is not of the essence of the device. On one end this blank is provided with an approximately square or oval opening $b^2$, which affords an oblique or lateral bearing $b^3$ $b^3$ upon the lacing-cord C when the latter is depressed between the longitudinal upset part $b^7$ and the sides $b^3$ $b^3$ of the opening $b^2$, (see Fig. 5,) and on the other with the longitudinal depression and slightly-inclined upset, represented by $b$, $b^7$, and $b^8$, Figs. 2, 4, and 6, and having the hole $b^5$, slightly oval in shape, to receive the bifurcated rivet $b^6$, which thereby holds the fastener firmly to its base A, The blank thus provided (see Fig. 4) is doubled over on itself about its middle until the lower end of the upset $b^7$ rests against the lower part or edge of the opening $b^2$, and the inclined end $b^8$, extending outwardly, serves to receive the cord C into a bight formed by the opening $b^2$, with its sides, and the upset $b^7$, with the cord between, wherein it is firmly held, and to release the same therefrom when desired.

Before folding the blank B, Fig. 4, into shape for fastening purposes the bifurcated rivet $b^6$ is inserted in the hole $b^5$, so as to be ready to be placed in position on the shoe by clinchers. The opening $b^2$ is punched from the upper side of the blank, so as to present a smooth surface to the action of the cord C when holding it against the rounded upset metal bearing $b^7$, thus insuring the cord from being frayed or cut in use. $c$ $c$ $c$, Fig. 1, represents the eyelets or hooks on a shoe-flap for lacing purposes.

The advantages which I have achieved by the above-described fastening device and which it possesses over similar articles lies in its capacity for, first, forcing the lacing-cord in contact with it into a U-shaped bight; second, providing a smooth bearing in the line of strain within the fastener for the cord, and, third, rendering the bearing of the upset part direct and uniform upon the inclosed cord, and thus the strain upon the latter in use, being lateral to the pressure of the upset on the cord, engages the entire strength of the metal in holding it in place.

Having thus described my invention, that which I claim as new, and desire to secure by Letters Patent, is—

The improved shoe-tie fastener herein described and shown, consisting of a single blank folded transversely on itself, the upper fold provided at one end with an opening $b^5$ to receive a fastening-rivet and near said end with an opening $b^2$, having converging walls $b^3$, and the lower fold provided with a longitudinal upset $b^7$, having an inclined end $b^8$, and a bottom parallel to the face of the blank and coinciding with the opening $b^2$ when the blank is folded, and a rivet inserted through the opening $b^5$ into the shoe.

J. B. CRAIG.

In presence of—
.S. S. MERRILL,
H. JULES MAILLOUX.